Patented Dec. 22, 1931

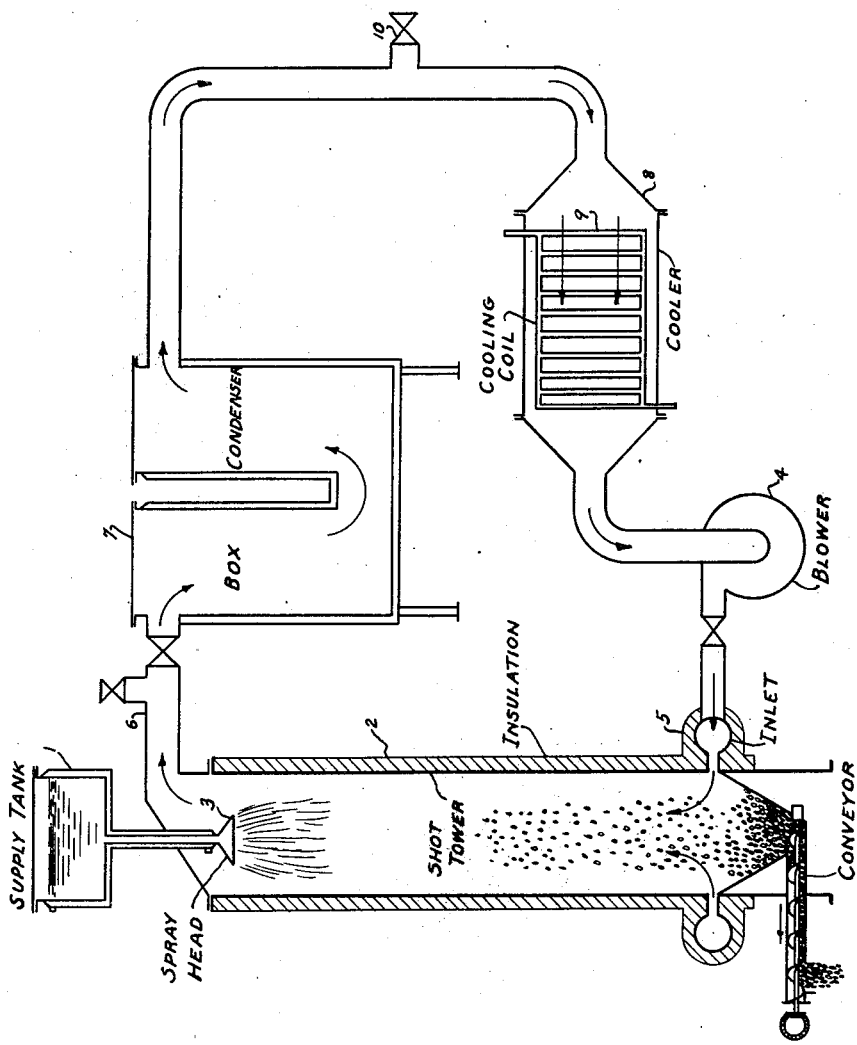

1,837,869

UNITED STATES PATENT OFFICE

JOSEPH E. JEWETT, OF MOUNT LEBANON, AND LLOYD C. DANIELS, OF CRAFTON, PENNSYLVANIA, ASSIGNORS TO THE SELDEN COMPANY, OF PITTSBURGH, PENNSYLVANIA, A CORPORATION OF DELAWARE

PHTHALIC ANHYDRIDE SHOT-LIKE PELLET

Application filed January 31, 1931. Serial No. 512,630.

This invention relates to phthalic anhydride product in a new compact and more resistant form.

According to the invention phthalic anhydride is produced in the form of hard globules or pellets which have a glazed surface and are highly resistant to dusting and consequent absorption of moisture. In the past, phthalic anhydride has been produced in the form of long needle crystals, which are very satisfactory for many purposes but which pack in such an open form that only small amounts can be shipped in a fairly large container. In Patent No. 1,789,967, to Daniels and Schwindt, dated Jan. 27, 1931, a product is described which results from the breaking up of these crystals into granules. These phthalic granules produce a much better package than do the needle crystals, but tend to form a small amount of dust, which is not only a slight annoyance in handling but which may cause the absorption of moisture from the air and formation of phthalic acid.

The present invention combines the dusting resistant properties of the long needle crystals with the increase in compactness obtained by the formation of granules, and produces a product which is not only easy to pack and ship, but in which dusting is reduced to a minimum. The product appears in the form of round or ovoid pellets or shot, which have a comparatively high apparent specific gravity and a hard surface glaze resulting from their method of production.

The phthalic anhydride pellets are produced from molten phthalic anhydride in an apparatus somewhat resembling a shot tower, in which the molten material is sprayed counter to a rising stream of cooled air, which causes hardening of the droplets and produces the surface glaze. The product is collected from the bottom of the tower by a conveyor, belt, or other removing means, while the air is preferably passed through a condenser for the removal of sublimed material, is recooled and recirculated into the bottom of the tower.

The accompanying drawing illustrates a form of apparatus which has proved satisfactory in preparing the product of the present invention, but the invention is not limited thereto.

Referring to the drawing, the phthalic anhydride is maintained in a molten condition in the steam jacketed supply tank 1, from whch it is sprayed into the top of the tower 2 by means of the spray head 3. The size of the orifices in the spray head depends of course on the height of the tower, the temperature of the recirculating air, and other physical factors, and will be determined for each installation by the chemical engineer. In general the size of the orifices will be such as to produce droplets as large as can be conveniently handled by the system, although in some cases, such as for example where a finer and quick dissolving product is desired, the orifices may be smaller and may even be such as to produce a frozen mist resembling sleet. The cooled air is pumped into the base of the tower by blower 4, and enters through the tuyères 5 or other suitable air introducing means. The rising current of air tends to cushion somewhat the shock of the falling phthalic anhydride, which is solidified in midair, and then passes through the outlet pipe 6 into the condenser 7. This is preferably a box condenser, and is inserted into the circuit to condense out any phthalic anhydride which may have sublimed into the air stream in the tower 2. Where this difficulty is not met with, the condenser can of course be eliminated, and conversely where excessive sublimation is experienced a plurality of condensers may be used or recirculation may be dispensed with and the outgoing air led to the sublimers of a phthalic anhydride purification plant such as that described in Patent No. 1,685,624 to C. E. Andrews.

Temperature control within the tower is maintained by precooling the incoming air, and for this purpose a cooler 8, supplied with cooling coils 9 is provided. The temperature of the brine in these coils and the size or the installation are so proportioned as to provide air at the proper temperature, and this air may be that which has been purified in the condenser 7 or fresh air entering through the valve 10 may be used, or both. Obviously the extent on atmospheric conditions, but as it is necessary to use dry air in the system and as this air can advantageously be dehydrated by cooling, the continuous operation of cooling coils is usually necessary. It is also possible to recirculate only a portion of the air used in the tower, part of it being drawn off and used in phthalic anhydride sublimation processes and the deficiency being made up by fresh air which has been dried by cooling, sulfuric acid wash, calcium chloride or other processes and introduced into the system through the valve 10.

When the system is properly operated, little difficulty is experienced from adherence of molten phthalic anhydride to the sides of the tower, but where this difficulty arises the walls of the tower may well be provided with coils or other heating means for intermittent melting down of any attached deposit. The use of a tower so constructed also makes it possible to shut down and start up the process with a minimum of difficulty, as well as preventing the building up of an adhering crust to the sides of the tower over long periods of time.

What is claimed as new is:

Phthalic anhydride in the form of hard, shot-like pellets with a hard surface glaze.

Signed at Pittsburgh, Pennsylvania, this 29th day of January, 1931.

JOSEPH E. JEWETT.
LLOYD C. DANIELS.